United States Patent [19]

Brundage

[11] Patent Number: 4,841,823
[45] Date of Patent: Jun. 27, 1989

[54] SCROLL SAW BLADE POSITION ADJUSTMENT AND WORK TABLE DAMPENER

[76] Inventor: Richard B. Brundage, 2 Whitfield La., Ladue, Mo. 63124

[21] Appl. No.: 76,918

[22] Filed: Jul. 23, 1987

[51] Int. Cl.⁴ .............................................. B27B 19/02
[52] U.S. Cl. ........................................ 83/781; 83/783; 83/662; 83/786; 403/7
[58] Field of Search .................. 83/781, 783, 784, 786, 83/782, 662, 574, 477, 471.3, 427, 432; 403/7, 8, 6

[56] References Cited

U.S. PATENT DOCUMENTS

| | | | |
|---|---|---|---|
| 131,323 | 9/1872 | Atkinson et al. | 83/777 |
| 2,208,843 | 7/1940 | Hedgpeth | 83/781 X |
| 2,233,461 | 3/1941 | Ungar | 403/7 |
| 2,453,899 | 11/1948 | Gaines | 83/781 X |
| 2,721,587 | 10/1955 | Dremel | 83/782 |
| 2,765,820 | 10/1956 | Perkins | 83/574 |
| 2,780,249 | 2/1957 | Andreae et al. | 83/781 |
| 3,538,964 | 11/1970 | Warrick et al. | 83/473 |
| 4,616,541 | 10/1986 | Eccardt et al. | 83/98 |

*Primary Examiner*—Frank T. Yost
*Assistant Examiner*—Eugenia A. Jones

[57] ABSTRACT

A blade positioner for a scroll saw is disclosed which permits adjustment of the saw blade relative to the pivoting beams or arms of the scroll saw so that the plane movement of the blade is coincident with the blade direction, particularly in the event that the ends of the arms are somewhat misaligned with respect to the plane of travel of the arms due to inaccuracies of the arm pivot bearing locations. Also disclosed is an anti-rattle spring interposed between the work table and work table support so as to minimize rattle of the work table relative to the support in all directions.

4 Claims, 5 Drawing Sheets

SCROLL SAW BLADE POSITION ADJUSTMENT AND WORK TABLE DAMPENER

BACKGROUND OF THE INVENTION

This invention relates to a scroll saw, and more particularly to a so called walking beam scroll saw or jig saw.

Generally, a scroll saw utilizes two parallel arms or beams pivotally mounted on a frame and having a relatively thin blade under tension between the outer ends of the beams. The beams are pivotally mounted on trunnions which in turn are journaled in bearings carried by the frame of the scroll saw. At the opposite end of the beams, an adjustable bolt and spring is provided so as to maintain the blade under tension. A motor or other drive system is connected to one of the beams so as to reciprocate the beams in an up and down fashion on their trunnions such that the saw blade reciprocates in a generally vertical blade plane relative to the work piece for cutting purposes. Such scroll saws may be utilized to make both straight line and curvilinear cuts in rather intricate patterns and shapes in a variety of sheet like materials including wood, metal, plastics and the like. Generally, the teeth on the blade are so shaped such that the blade cuts only on the down stroke.

Such walking beam scroll saws are well known and reference may be made to my previous co-assigned U.S. Pat. No. 4,616,541. In addition, reference may be made to such U.S. Pat. Nos. as 76,730, 83,362, 126,740, 191,239, 2,240,307, 3,104,688, 3,213,909, and 3,878,876. In addition, French Patent No. 1,206,523 and British Patent No. 22,960 may also be of interest.

In scroll saws such as disclosed in my prior U.S. Pat. No. 4,616,541 and other similar prior art scroll saws, it has been a continuing and longstanding problem that, due to the fact that the pivot bearings for the trunnions of the upper and the lower beams or arms of the saw are somewhat out of alignment with one another, the ends of the beam are accordingly somewhat misaligned with respect to the plane of arm travel as the arms are reciprocated up and down. This means that the reciprocating motion of the blade may not be coincident with the direction in which the teeth of the blade are oriented. In turn, this may result in less efficient cutting action for the blade in an inaccurate cut, and binding between the blade and the workpiece.

Additionally, many such scroll saws are designed such that the work table is pivotally moveable with respect to the frame so as to permit bevel cuts in the work piece by inclining the work table and the work supported thereby relative to the vertical plane of the blade. However, such scroll saw designs have typically utilized a compression coil spring interposed between a support for table and the work table itself so as to minimize rattling of the table with respect to the support. These compression coil springs, however, worked effectively in only one plane, primarily in the longitudinal direction of the coil spring, and took up considerable room (volume) in the saw.

SUMMARY OF THE INVENTION

Among the several objects and features of the present invention may be noted the provision of a readily adjustable blade holder which permits the saw blade to be readily adjusted with respect to the ends of the arms so that the motion of the blade is substantially coincident with the blade direction, even if the pivot bearing locations of the arms are misaligned with respect to one another due to dimensional varations or wear during the service life of the saw;

The provision of such a scroll saw in which the work table is pivotal with respect to the frame for effecting bevel cuts with the work table being restrained against rattling along three axes;

The provision of such a scroll saw in which the above noted anti-rattle feature is of compact size;

The provision of a scroll saw which is of rugged and simple construction, which easy and inexpensive to manufacture, which is readily adjustable, and which has a long service life.

Other objects and features of this invention will be in part apparant and in part pointed out hereinafter.

Briefly stated, this invention relates to a scroll saw comprising a frame, a pair of spaced, generally parrallel (horizontal) arms which are pivotally mounted on the frame. A blade is interposed between the arms at the front thereof, and means for tensioning the blades is provided at the other end of the arms. Further, means for pivotally driving the arms with respect to the frame is provided so as to reciprocably drive the blade in a generally vertical direction. Specifically, the improvement of this invention relates to means for adjusting the blade relative to the arm so that the plane of the blade is substantially coincident with the plane of movement of the ends of the arms.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
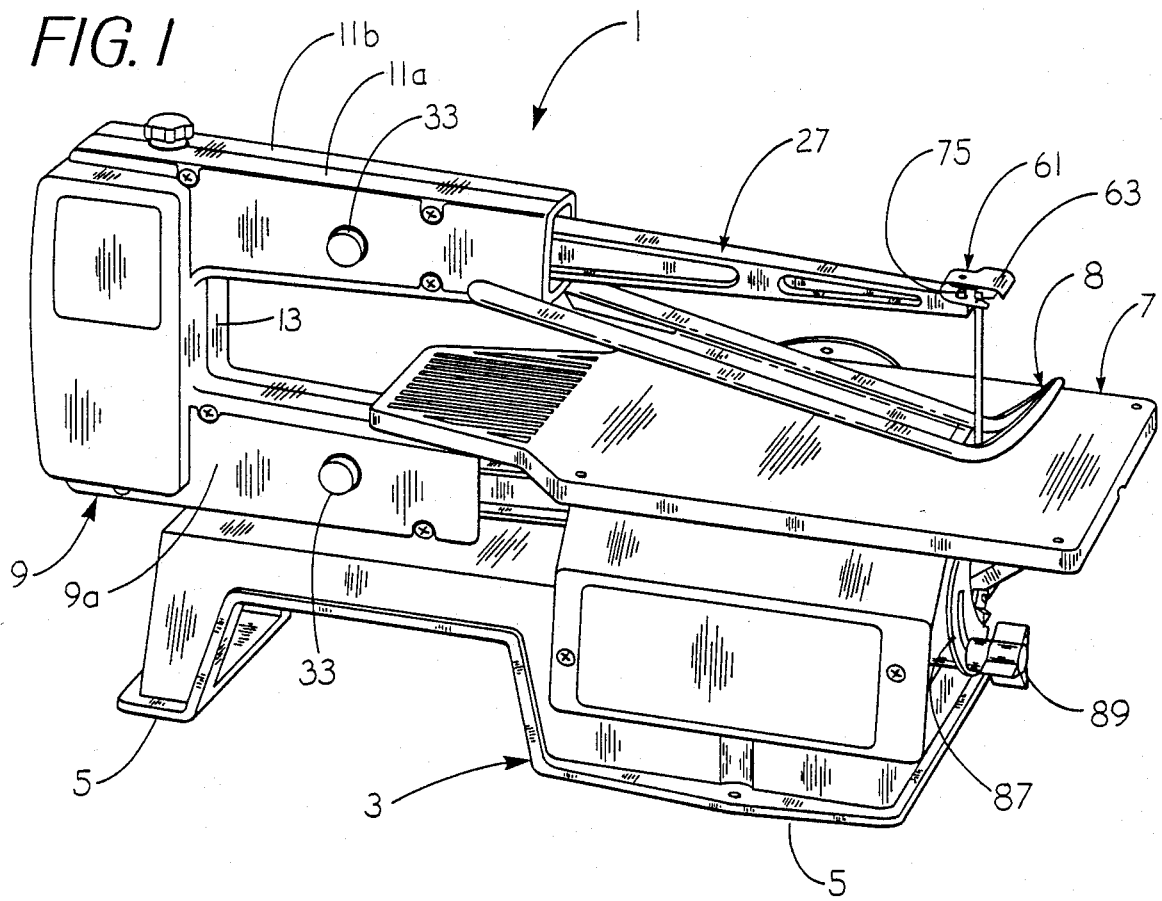
FIG. 1 is a perspective view of a scroll saw incorporating the blade adjustment system of the present invention.

Referring now to the drawings, a motorized scroll saw of the walking beam type is indicated in its entirety by reference character 1. The scroll saw is shown to comprise a base or frame 3 of integral cast metal construction having feet 5 and a work table 7 pivotally mounted thereto in a manner as will hereinafter appear. The frame includes a diecast saw frame 9 comprised of two mating diecast right and lefthand frame members, as generally at 9a, 9b. Each of these diecast frame members include upper and lower frame arms 11a and 11b, respectively. A frame back 13 is provided between the upper and lower arms 11a, 11b of each frame numbers. Frame 3 further has a motor mounting platform 15 on which an induction electric motor 17 is mounted. The motor is supplied with electrical power via power cord 19 and is controlled by an on/off switch 21. Motor 17 has a drive shaft 23 to which is connected an eccentric crank arm 25 for reciprocably driving the saw in a manner as will appear.

Specifically, saw 1 has an upper beam or arm 27 and a lower beam or arm 29, both of which are pivotally mounted with respect to respective upper and lower frame arms 11a and 11b of frame 3 by means of trunnions 31 extending outwardly from the sides of the arms intermediate there ends. Trunnions 31 are journaled in trunnion pivot bearings 33 which are received in openings 35 provided in the frame arms 11a, 11b. An eccentric drive link 37 interconnects the eccentric crank arm 25 such that upon operation of the drive shaft, the lower arm 29 is caused to reciprocate in an up and down fashion and to rotate or pivot on its trunnions 31.

At the rear ends of arms 27 and 29, a blade tensioning assembly, as indicated in its entirety at 39 is provided and a blade assembly 41 is provided at the other or front ends of the arms. In this manner, the upper and lower arms 27 and 29 are interconnected such that the upper arm reciprocates with the lower arm. Specifically, blade tensioning assembly 39 comprises a tension bolt 43 which extends between the rear ends of arms 27 and 29. Pivot wedges 45a, 45b are carried by tension bolt 43. A formed steel spring retainer 47 is carried by the lower face of lower arm 29 and is disposed between the head of tension bolt 43 and the lower portion of the lower pivot wedge 45b so as to maintain the various ports of the tension assembly in assembled relation in the event all compression is removed therefrom. The lower wedge 45b is received within a corresponding lower notch 49b provided in the inner or rear end of the arm 29. Likewise, the upper pivot wedge 45a is received in a corresponding notch 49a in the upper face of upper arm 27 at the inner or rear end thereof. A knob 51 is pinned onto the threaded upper end of tension bolt 43 which engages the threaded upper wedge 45a and positively draws the rear or inner ends of the arms 27 and 29 toward one another and subsequently places tension on blade assembly 41. A serpentine spring 53 is received in apertures 55 in the sides of arms 27 and 29 so as to maintain some tension thereon when changing blades or when a blade may happen to break during operation.

Blade assembly 41 includes a scroll saw blade 57 having transversely extending blade pins 59 at the top and bottom thereof. As is conventional, scroll saw blade 57 has saw teeth along one edge thereof with the saw teeth being disposed to cut substantially only on the down stroke of the saw blade.

Figure 8:
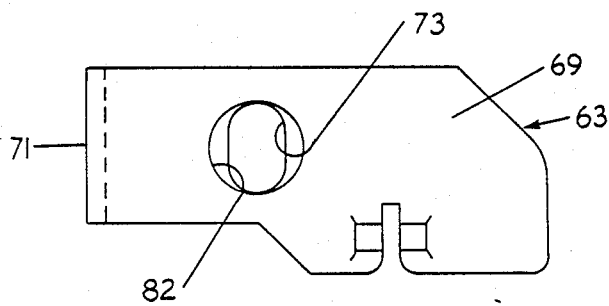
FIG. 8 is a top plan view of the blade holder shown in FIG. 7.
Figure 7:
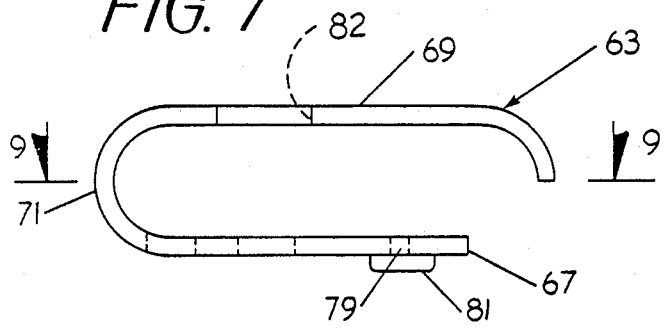
FIG. 7 is a side elevational view of a blade holder of the present invention on an enlarged scale.
Figure 11:
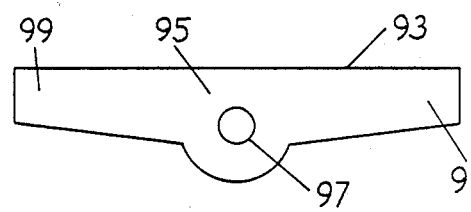
FIG. 11 is a front elevational view of a leaf type anti-rattle spring.
Figure 9:
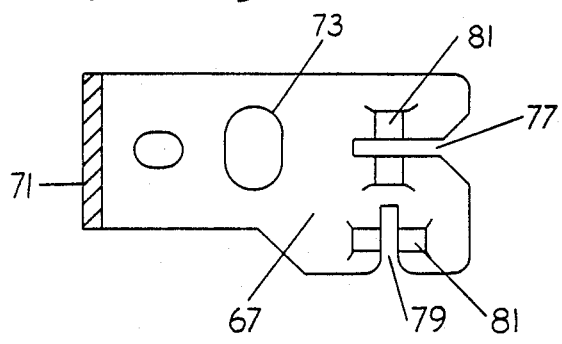
FIG. 9 is a cross sectional view of the blade holder taken along line 9—9 of FIG. 7.
Figure 12:
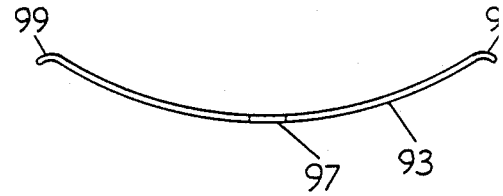
FIG. 12 is an edge elevational view of the anti-rattle spring of FIG. 11.

As indicated generally at 61, means is provided for adjusting the position of blade 57 so that the position of the blade relative to the arms may be adjusted whereby the plane of the blade is substantially coincident with the plane of movement of the ends of arms of 27 and 29. This insures that the efficiency, accuracy, and free cutting action of the saw blade will be maximized. More specifically, this adjusting means is shown to comprise an upper blade holder clip 63 carried on the upper face of upper arm or beam 27 and a lower blade holder clip 65 carried on the lower face of lower beam 29. These blade holder clips 63 and 65 are functionally identical and, for the purposes of brevity, only the upper blade holder clip, as illustrated in FIGS. 7-9 will be discussed in detail.

Figure 6:
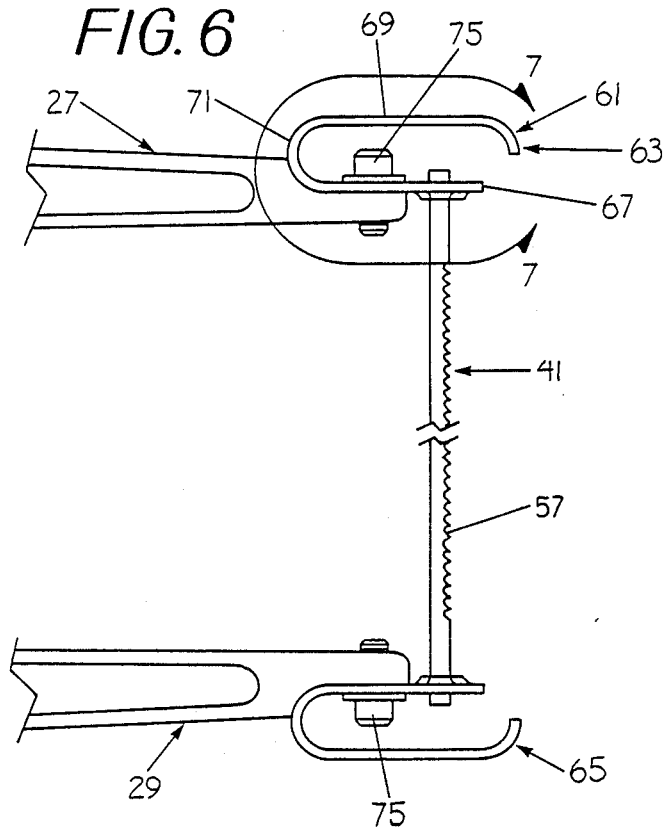
FIG. 6 is an enlarged view of the ends of the scroll saw arms and blades, as taken along line 66 of FIG. 3.

Specifically, blade holder clip 63 comprises a one-piece member made of resilient spring steel or the like having a base portion 67 which is adapted to bear against and to be secured to the upper face of the outer end of upper beam 27 in a manner as best illustrated in FIG. 6. The clip further includes an integral hood 69 disposed above base 67 and a back portion 71 interconnecting the base and the hood. An oblong mounting opening 73 is provided in base 67 and, as shown in FIG. 9, this oblong mounting opening extends generally from side to side relative the clip. A cap screw 75 may be inserted into mounting opening 73 so as to threadably engage a threaded aperature (not shown) on the outer or upper surface of the upper beam 27. It will be appreciated that with capscrew 75 threaded into its respective threaded aperture with the head of the capscrew bearing on the upper face of base, the cap screw positively holds the clip in an adjusted position with respect to its respective arm 27 or 29. Further, base 67 has a front facing blade slot 77 and a side facing blade slot 79 therein for receiving a respective scroll saw blade 57. Each of these blade slots 77 and 79 have respective pin receiving dimples 81 therein which support blade pins 59 and thus hold the blade with respect to the blade holder. It will be appreciated that with mounting opening 73 and the base being oblong shaped, that the blade holder clip 63 may be readily moved relative to its respective arm in side to side direction when capscrew 75 is loosened to a desired adjusted position and then the clip may be locked in place relative to the arm by tightening the capscrew.

Hood 69 of clip 53 has an enlarged opening 82 in the top thereof generally and register with oblong opening 73 in the base such that with capscrew 75 inserted in the oblong slot, access may be had to the capscrew via an Allen wrench inserted through opening 82. This facilitates tightening and loosening of the capscrew.

In operation, to insert a blade 57 onto blade holders 63 and 65, the outer ends of arms 27 and 29 are permitted to move somewhat closer together by loosening knob 51 on tension bolt 43. In this manner, the blade 57 may be inserted into a respective blade slot 77 or 79 the upper and lower blade holders 63 and 65 with the blade pins 59 received in the dimples 81 on the opposite sides of the selected blade slot. Then, after the blade has been so installed, knob 51 may be turned in the opposite direction so as to increase the tension on the blade.

In the event the blade runout is not true, such as may be caused by either the blade holder clips 63 and 65 not being properly positioned on the ends of their respective arms 27 and 29 or on account of a slight misalignment of the ends of the arms with respect to the planes of reciprocating travel of the arm due to normal dimensional tolerances between the pivot trunnions 31 of the upper and lower arms and the trunnion bearing openings 35 in the saw frame 9. To correct this blade runout problem, capscrews 75 may be loosened and the position of the blade holders 63 and 65 on the end of their respective arms 27 and 29 adjusted such that the plane of the blade is in line with the motion of the arms. The capscrews are retightened.

Figure 2:
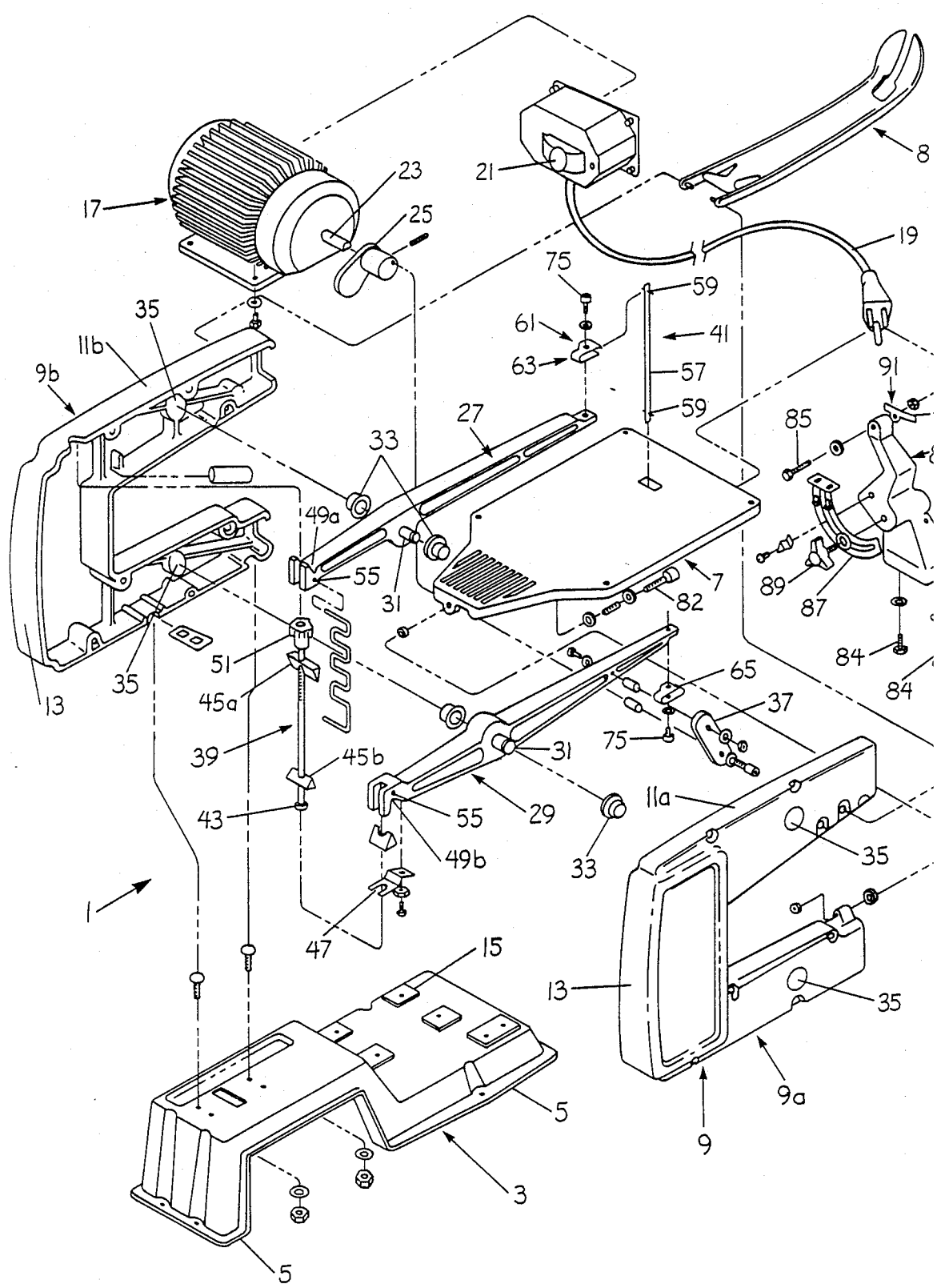
FIG. 2 is an exploded perspective view of the scroll saw illustrated in FIG. 1.
Figure 3:
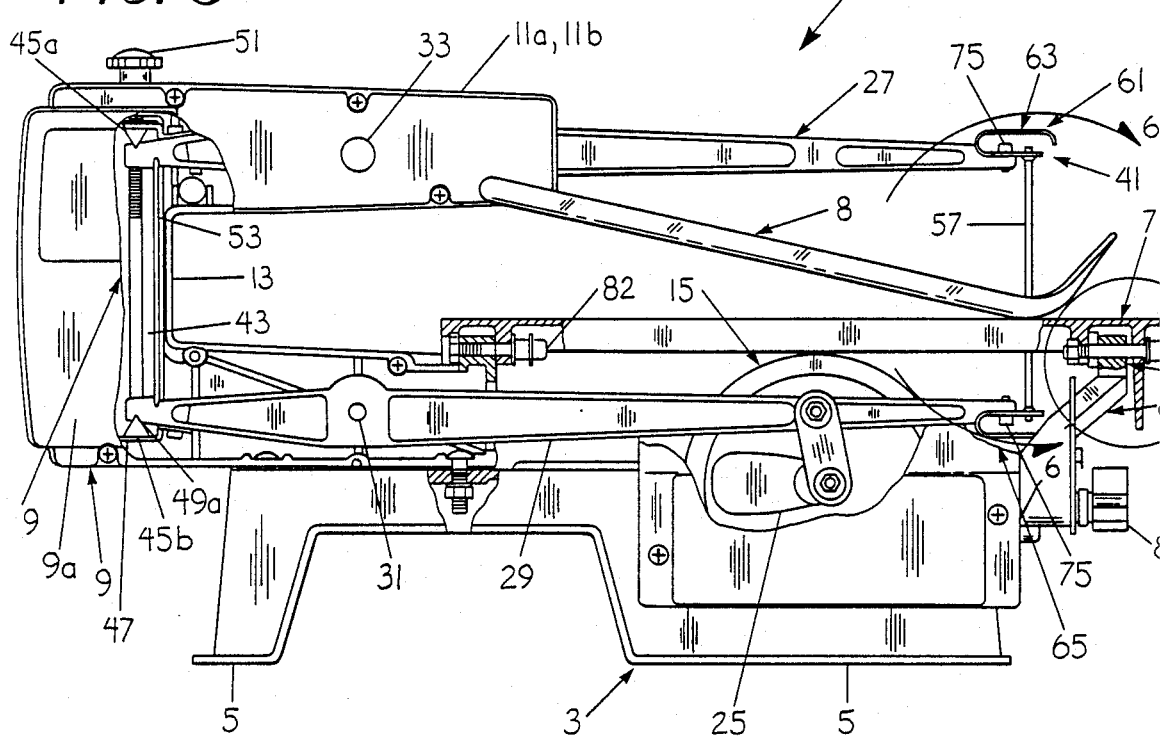
FIG. 3 is a right side elevational view of the scroll saw with portions thereof broken away to illustrate details of construction.
Figure 4:
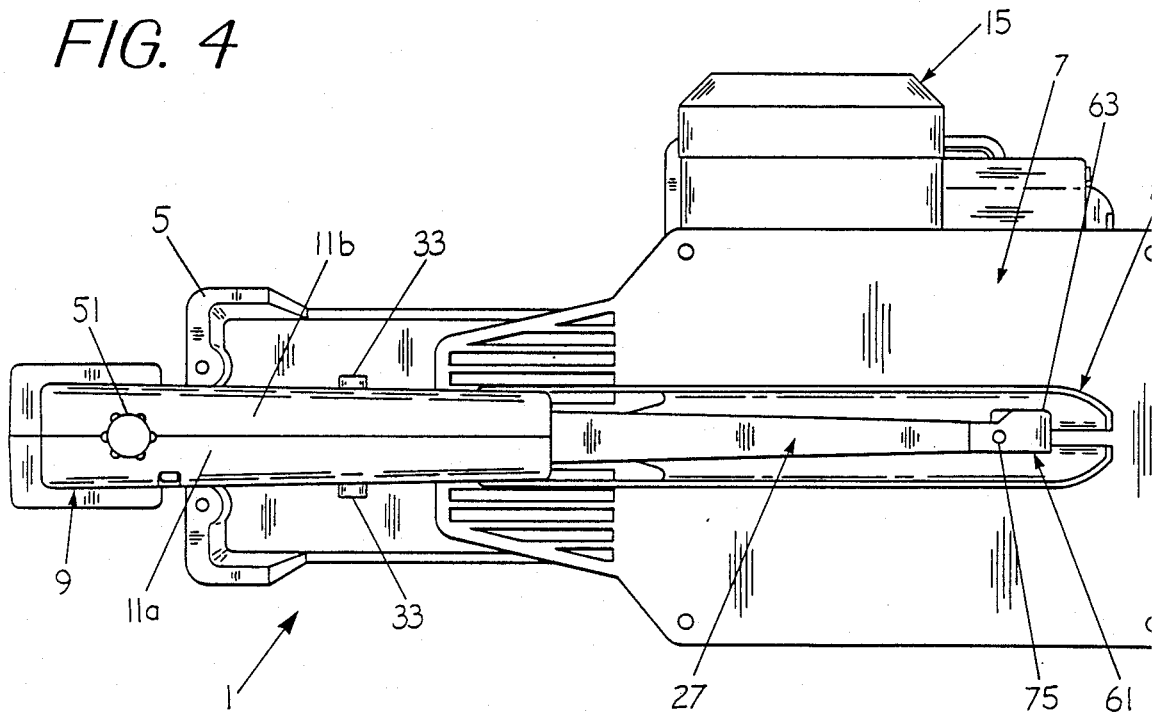
FIG. 4 is a top plan view of the scroll saw.
Figure 5:
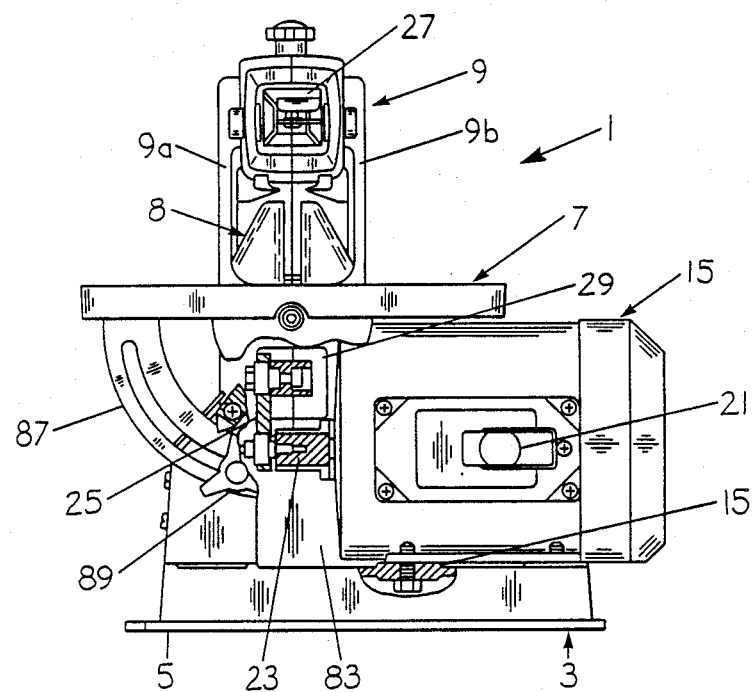
FIG. 5 is a front end elevational view of the scroll saw with parts broken away to illustrate details of construction.

As previously mentioned, table 7 is pivotally mounted with respect to frame 3 such that the work table may be rotated about a horizontal, longitudinal axis with respect to the frame such that a work piece (not shown) supported on table 7 may be inclined with respect to the vertical plane of blade 57 for the purpose of enabling beveled cuts to be made on the work piece supported by the inclined work table 7. As indicated at 82, the rear portion of table 7 is pivotally mounted with respect to saw frame 9 by a suitable pivot bolt. The frame of the work table 7 is supported with respect to frame 3 by means of a table support, as generally indicated at 83. Table support 83 is secured to frame 3 by means of bolts 84 (as shown in FIG. 2). A so called pivot pin 85 pivotally supports the front end of table 7 with respect to an upwardly extending portion of table support 83 with pivot pin and pivot bolt 82 being substantially coaxial aligned so as to define a generally horizontal axis of rotation of table 7 with respect to frame 3. An arcuate bevel indicator 87 is secured to the bottom face of table 7 and is secured relative to support 83 by means of a clamping screw 89. Upon loosening the clamping screw, table 7 may be pivoted on bolt 82 and on pivot pin 85 to a desired bevel angle and securely locked or clamped in that desired bevel angle upon tightening clamp screw 89.

Figure 10:
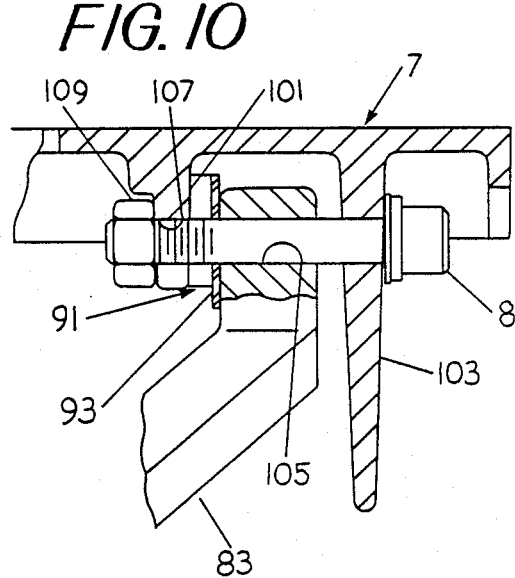
FIG. 10 is an enlarged view taken along line 10—10 of FIG. 3 illustrating the manner in which the table is pivotally mounted with respect to the frame so as to prevent rattling of the table.

In accordance with this invention, means, as generally indicated at 91, is provided for minimizing rattle of table 7 with respect to support 83 and further with respect to frame 3 upon reciprocable operation of the saw. More specifically, this anti-rattle means 91 comprises an anti-rattle leaf spring 93 which is received on pivot pin 85 and which is disposed between table 7 and appropriate vertical face of support 83 in the manner best illustrated in FIG. 10. More specifically, anti rattle spring 93 has a central portion 95 having a center aperture 97 therethrough for recieving the shank of pivot pin 85. The spring further has outwardly extending wing portions 99 which are adapted to bear against a downwardly extending, generally vertical face 101 provided on table 7. Pivot pin 85 is inserted through a portion of flange 103 of table 7, through an opening 105 in support 83 and through another opening 107 in flange 101 with the anti-rattle spring 93 interposed between support 83 and the adjacent vertical face of flange 101. In accordance with this invention, a nut 109 is threaded on bolt 85 so that with the vertical face 101 of table 7 positioned relative to frame 3 and support 83, as shown, anti-rattle spring 93 is at least partially compressed so as to resiliently exerts frictional force between table 7 and support 83 along three axes of direction relative to the support, even when the table is angled at any desired bevel angle with its specified range of bevel angle positions and independent of the fit between pin 85 and support 83.

In view of the above, it will be seen that the several objects and features of this invention are achieved and other advantageous results attained.

As other changes could be made in the above constructions without departing from the scope of the invention, it is intended that all matter contained in the above description are shown in the accompanying drawing shall be interpreted as illustrative and not in a limiting sense.

I claim:
1. In a scroll saw comprising a frame, a pair of spaced generally parallel arms pivotally mounted on said frame, a blade interposed between said arms at one end thereof, means for tensioning said blade, means for pivotally driving said arms with respect to said frame thereby to reciprocably drive said blade, wherein said improvement comprises blade holder means for adjusting the position of the blade relative to said arms in a direction generally transverse to the plane of movement of the ends of the arms so that the plane of the blade is substantially coincident with the plane of movement of the ends of the arms, said blade holder means including a one piece clip adapted to be adjustably secured to the end of at least one of said arms, said clip having means for mounting said blade thereon, said clip further having an elongated slot therein for receiving a fastener, said slot being larger than said fastener so as to permit adjustment of said clip on said arm with respect to said fastener thereby to permit a blade received in said blade mounting means of said clip to be positioned so as to be substantially coincident with the plane of movement of the ends of said arms.

2. In a scroll saw as set forth in claim 1 wherein said clip includes a base portion containing said blade mounting means and elongated slot and an integral hood portion overlying said base portion, an opening in said overlying integral hood portion in substantial register with said elongated slot in base portion thereby to permit loosening and tightening of said fastener.

3. In a scroll saw as set forth in claim 1 wherein said means for mounting said blade on said clip comprises a slit in said clip for receiving a portion of said blade, the latter having pins extending transversely therefrom, and said base portion, on opposite sides of said slit, having means engageable with said blade pins for holding said blade in desired position with respect to said slit.

4. In a scroll saw comprising a frame, a pair of spaced, generally parallel arms pivotally mounted on said frame, a blade interposed between said arms and at one end thereof, and a table adjacent said blade for holding a work piece to be cut, said table being pivotally mounted on said frame for pivotal movement about a generally horizontal, longitudinal axis such that the table is inclined with respect to the blade so as to permit beveled cuts to be made in the work piece relative to the blade, wherein the improvement comprises: means for substantially eliminating rattling of the table with respect to the frame during reciprocal operation of said saw, said anti-rattle means comprising a pivot pin for pivotally mounting said table with respect to said frame, a leaf spring positioned proximate said pivot pin and interposed between a portion of said frame and a portion of said table for resiliently biasing said table and frame portions away from one another along three axes of direction relative to said frame portion when the table is at any desired adjusted position, and said leaf spring having a central portion with an opening therein for receiving said pivot pin and opposed wing portions bowed outwardly from the central portion with the central portion being resiliently engageable with one surface of said frame and with said wing portions being resiliently engageable with a cooperating surface of said table, thereby to resiliently hold the table relative to the support regardless of the pivotal position of the table with regard to the frame.

* * * * *

UNITED STATES PATENT AND TRADEMARK OFFICE
CERTIFICATE OF CORRECTION

PATENT NO. : 4,841,823
DATED : June 27, 1989
INVENTOR(S) : Richard B. Brundage

It is certified that error appears in the above-identified patent and that said Letters Patent is hereby corrected as shown below:

On the title page Insert

--(73) Assignee: Emerson Electric Co., St. Louis, Mo--.

Signed and Sealed this

Twenty-third Day of October, 1990

Attest:

HARRY F. MANBECK, JR.

*Attesting Officer*  *Commissioner of Patents and Trademarks*